United States Patent
Cato et al.

(10) Patent No.: US 10,207,540 B2
(45) Date of Patent: Feb. 19, 2019

(54) FUNCTIONALIZED POLYMER BLENDS FOR IMPROVED WEAR

(71) Applicants: Compagmie Generale des Etablissements Michelin, Clermont-Ferrand (FR); Michelin Recherche et Technique S.A., Granges-Paccot (CH); Anthony Derbin Cato, Greenville, SC (US); Raymond Stubblefield, Greenville, SC (US); Xavier Saintigny, Greenville, SC (US); Olivier Piffard, Greenville, SC (US)

(72) Inventors: Anthony Derbin Cato, Greenville, SC (US); Raymond Stubblefield, Greenville, SC (US); Xavier Saintigny, Greenville, SC (US); Olivier Piffard, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 0 days.

(21) Appl. No.: 15/033,635

(22) PCT Filed: Oct. 27, 2014

(86) PCT No.: PCT/US2014/062356
§ 371 (c)(1),
(2) Date: Apr. 30, 2016

(87) PCT Pub. No.: WO2015/065884
PCT Pub. Date: May 7, 2015

(65) Prior Publication Data
US 2016/0280007 A1    Sep. 29, 2016

Related U.S. Application Data

(60) Provisional application No. 61/898,409, filed on Oct. 31, 2013.

(51) Int. Cl.
*B60C 1/00*   (2006.01)
*C08L 9/06*   (2006.01)
*C08L 15/00*  (2006.01)
*B60C 11/00*  (2006.01)

(52) U.S. Cl.
CPC .......... *B60C 1/0016* (2013.01); *B60C 11/005* (2013.01); *B60C 11/0008* (2013.01); *C08L 9/06* (2013.01); *C08L 15/00* (2013.01); *B60C 2011/0025* (2013.01)

(58) Field of Classification Search
CPC . B60C 1/0016; B60C 11/0008; B60C 11/005; B60C 2011/0025; C08L 9/06
USPC ....................................................... 524/526
See application file for complete search history.

(56) References Cited

U.S. PATENT DOCUMENTS

| | | | |
|---|---|---|---|
| 2011/0178233 A1* | 7/2011 | Chaboche | B60C 1/0016 524/571 |
| 2013/0096248 A1* | 4/2013 | Thompson | B60C 1/0016 524/526 |
| 2013/0158185 A1* | 6/2013 | Thompson | B60C 1/0016 524/526 |

FOREIGN PATENT DOCUMENTS

WO    WO2013147827 A1    10/2013

OTHER PUBLICATIONS

International Search Report, dated Sep. 3, 2015.

* cited by examiner

*Primary Examiner* — Hui H Chin
(74) *Attorney, Agent, or Firm* — Frank J. Campigotto

(57) ABSTRACT

A tire tread formed at least in part from a rubber composition that is based upon a cross-linkable rubber composition that may include between 50 phr and 90 phr of a first highly unsaturated elastomer being middle chain functionalized with an aminoalkoxysilane group and having a Tg of between −108° C. and −45° C. and between 10 phr and 50 phr of a second highly unsaturated elastomer being end-chain functionalized with a silanol group and having a Tg of between −108° C. and −10° C. The rubber composition may further include between 50 phr and 150 phr of a silica filler and a plasticizing system comprising between 5 phr and 120 phr of a plasticizing resin having a Tg of at least 25° C. and between 0 phr and 60 phr of a plasticizing liquid.

15 Claims, No Drawings

FUNCTIONALIZED POLYMER BLENDS FOR IMPROVED WEAR

BACKGROUND OF THE INVENTION

Field of the Invention

This invention relates generally rubber compositions and more particularly, to rubber compositions useful for articles such as tires.

Description of the Related Art

The tire industry strives to improve the wear properties of tires for many reasons including lessening the impact of worn tires on the environment by providing tires that will run longer before having to be discarded and improving the satisfaction of consumers by providing them with tires that can run longer before having to be replaced with new ones.

However, in their efforts to improve wear properties, tire designers often face a compromise between the wear properties they want to improve and other desirable properties of the tire. Tire compromises occur when a tire designer changes a design to improve one characteristic of the tire and there then occurs an offsetting decline in another tire characteristic. One such compromise exists between tire wear and wet braking. Tire designers therefore seek improvements that can break a compromise so that by increasing the one property, there is not a significant corresponding decline in another desired tire characteristic.

Therefore the tire industry seeks to break the compromise between wear and wet braking by searching for ways to improve wear without a significant impact on wet braking.

SUMMARY

Particular embodiments include tire treads formed at least in part from a rubber composition that is based upon a cross-linkable rubber composition that may include between 50 phr and 90 phr of a first highly unsaturated elastomer being middle chain functionalized with an aminoalkoxysilane group and having a Tg of between −108° C. and −45° C. and between 10 phr and 50 phr of a second highly unsaturated elastomer being end-chain functionalized with a silanol group and having a Tg of between −108° C. and −10° C. The rubber composition may further include between 50 phr and 150 phr of a silica filler and a plasticizing system comprising between 5 phr and 120 phr of a plasticizing resin having a Tg of at least 25° C. and between 0 phr and 60 phr of a plasticizing liquid.

In particular embodiments the tire tread may be fully formed from the cross-linkable rubber composition.

DETAILED DESCRIPTION OF PARTICULAR EMBODIMENTS

Particular embodiments of the present invention include treads and their tires that have improved tire wear performance without a significant loss in their wet braking performance. This improved wear has been achieved by forming unique tire treads from a rubber composition having a blend of rubbers that have been functionalized in two different ways, one useful functionalization being middle-chain with an aminoalkoxysilane group and the other being end-chain with a silanol group. Surprisingly this blend of functionalized rubbers provides a synergistic effect on the wear properties of tires so that treads built of the blended rubbers have better wear properties than would be expected based on the performance of treads built from the non-blended rubbers. Furthermore this surprising result is obtained without a significant impact on the tires wet braking performance.

As used herein, "phr" is "parts per hundred parts of rubber by weight" and is a common measurement in the art wherein components of a rubber composition are measured relative to the total weight of rubber in the composition, i.e., parts by weight of the component per 100 parts by weight of the total rubber(s) in the composition.

As used herein, elastomer and rubber are synonymous terms.

As used herein, "based upon" is a term recognizing that embodiments of the present invention are made of vulcanized or cured rubber compositions that were, at the time of their assembly, uncured. The cured rubber composition is therefore "based upon" the uncured rubber composition. In other words, the cross-linked rubber composition is based upon or comprises the constituents of the cross-linkable rubber composition.

As used herein, the expression "functionalized diene elastomer" should be understood as meaning a diene elastomer that contains a moiety comprising one or more heteroatoms. Such moieties are often selected, for example, based upon their ability to interact with the fillers that are added to a rubber composition such as carbon black and silica. Such groups may also be referred to as "functional groups" and the two terms are used interchangeably.

Functional groups may be located at the end of the elastomer chain wherein the diene elastomer can be said to be chain-end functionalized. Alternatively such functional groups may be located in the linear main elastomer chain, wherein the diene elastomer can be said to be middle-chain functionalized even if the group is not located precisely in the middle of the elastomer chain.

Functional groups may also be central such that n elastomer chains (n>2) are bonded forming a star-shaped structure of the elastomer wherein the diene elastomer can be said, for example, to be star-branched. This embodiment of a diene elastomer is not included in the middle-chain functionalized elastomer definition.

As is known generally, a tire tread is the road-contacting portion of a vehicle tire that extends circumferentially about the tire. It is designed to provide the handling characteristics required by the vehicle; e.g., traction, dry braking, wet braking, cornering and so forth—all being preferably provided with a minimum amount of noise being generated and at a low rolling resistance.

Treads of the type that are disclosed herein include tread elements that are the structural features of the tread that contact the ground and in particular embodiments, at least some such tread elements are formed for the disclosed rubber compositions having a blend of functionalized rubber. Such structural features may be of any type or shape, examples of which include tread blocks and tread ribs. Tread blocks have a perimeter defined by one or more grooves that create an isolated structure in the tread while a rib runs substantially in the longitudinal (circumferential) direction and is not interrupted by any grooves that run in the substantially lateral direction or any other grooves that are oblique thereto.

As noted above, particular embodiments of the present invention include treads and tires having such treads manufactured from a rubber composition that includes a mixture of two functionalized rubber components, one of the rubber components being a middle-chain functionalized highly unsaturated rubber and another of the rubber components being an end-chain functionalized highly unsaturated rubber.

In the case of the end-chain functionalized highly unsaturated rubber, the rubber is functionalized with a "silanol" function of formula SiOH. Diene elastomers corresponding to this definition are well known and have, for example, been described in the U.S. Pat. No. 6,013,718, which is hereby fully incorporated by reference. Other documents describing silanol functionalized rubber may also be found in WO 2008/141702, WO 2006/050486, EP 0 877 047 B1 or EP 1 400 559 B1.

The functional group may take the form as a single silanol or a polysiloxane block having a single silanol end. The polysiloxane block may be described as:

wherein $R_1$ and $R_2$, that are identical or different, denote an alkyl, cycloalkyl, aryl, alkaryl or vinyl group that has from 1 to 10 carbons and x is an integer of between 1 and 1500 or alternatively, between 1 and 50. In particular embodiments, the silanol function SiOH may take the form of a dimethylsilanol group —SiMe$_2$OH. According to particular embodiments of the invention, the silanol function may be bonded to a polysiloxane which constitutes one of the blocks of a block copolymer that also comprises a polydiene block, as described for example in U.S. Pat. No. 6,013,718.

In the case of the middle-chain functionalized highly unsaturated rubber, the functional group is an aminoalkoxysilane group, that is, the functional group includes an amine functionality in addition to the silanol functionality. Diene elastomers corresponding to this definition are well known and have, for example, been described in the patent application US2011/0178233, which is hereby fully incorporated by reference. In particular embodiments the amine may be primary, secondary or tertiary and in some embodiments the amine is limited to a tertiary amine. The mid-chain functionality attached to the elastomer by the Si may be, for example, HO—Si—Me$_3$—N(CH$_2$CH$_3$)$_2$, wherein each of the CH$_2$CH$_3$ moieties are bound to the N to provide a tertiary amine. More specifically, in particular embodiments the mid-chain functionality may be expressed as HO—Si—R$_1$—NR$_2$R$_3$, wherein R$_2$ and R$_3$ are each bound to the N to provide a tertiary amine. In particular embodiments, R$_1$ may be a linear or branched C$_1$-C$_{10}$ alkyl, a C$_6$-C$_{18}$ aryl derivative, a C$_1$-C$_5$ alkyl or a C$_2$-C$_4$ alkyl. R2 and R3 may be the same or different and may be a H atom, a linear or branched C$_1$-C$_{10}$ alkyl, a C$_6$-C$_{18}$ aryl derivative, a C$_1$-C$_5$ alkyl or a C$_2$-C$_4$ alkyl. Other examples of documents describing silanol and amine functionality include EP 1 457 501 B1, WO 2006/076629, EP 0 341 496 B1 and WO 2004/111094.

As a functionalizing agent that gives rise to the synthesis of an elastomer bearing an alkoxysilane function and an amine function, examples include N,N-dialkylaminopropyltrialkoxysilanes, cyclic azadialkoxysilanes such as N-alkyl-aza-dialkoxysilacycloalkanes, 2-pyridylethyltrialkoxysilanes, 3-carbazolethyltrialkoxy-silanes, 3-alkylideneaminopropyltrialkoxysilanes, N-trialkoxysilyl-propylmorpholines, especially 3-(N,N-dimethylaminopropyl)trimethoxysilane, 3-(1,3-dimethylbutylidene)-aminopropyltriethoxysilane, N-n-butyl-aza-2,2-dimethoxysilacyclopentane, 2-(4-pyridylethyl)-triethoxysilane and 2-(trimethoxysilyl)pyridine.

The mixture of these functionalized rubber components in the rubber compositions disclosed herein may range from between 50 phr and 90 phr of the middle-chain functionalized rubber and between 10 phr and 50 phr of the end-chain functionalized rubber. Alternatively the middle-chain functionalized rubber may range between 50 phr and 80 phr, between 50 phr and 70 phr, between 50 phr and 60 phr, between 60 phr and 90 phr, between 60 phr and 80 phr, between 60 phr and 70 phr, between 70 phr and 90 phr or between 70 phr and 80 phr.

Alternatively the end-chain functionalized rubber may range between 20 phr and 50 phr, between 30 phr and 50 phr, between 40 phr and 50 phr, between 10 phr and 40 phr, between 20 phr and 40 phr, between 30 phr and 40 phr, between 10 phr and 30 phr or between 20 phr and 30 phr.

Particular embodiments of the disclosed rubber compositions limit the mixture of the two types of functionalized rubber components to a 50-50 mixture while other embodiments limit the rubber composition to only these two types of functionalized rubber components without the addition of any other elastomeric component, whether functionalized with other non-silanol functionalities or not functionalized at all. It is contemplated that in some embodiments, up to 10 phr, or alternatively up to 5 phr of another rubber component may be added to the rubber composition, such rubber component being either a highly unsaturated diene rubber or an essentially unsaturated diene rubber or a combination thereof.

The middle-chain functionalized rubber component may further be described in some embodiments as having a glass transition temperature of between −108° C. and −45° C. or alternatively between −100° C. and −60° C., −100° C. and −50° C. or between −95° C. and −80° C. The end-chain functionalized rubber component may further be described in some embodiments as having glass transition temperature of between −108° C. and −10° C. or alternatively between −90° C. and −15° C., between −80° C. and −10° C., between −80° C. and −15° C., between −70° C. and −15° C. or between −70° C. and −20° C. Glass transition temperatures are measured by differential scanning calorimetry (DCS) in accordance with ASTM D3418.

Suitable functionalized elastomers for use in embodiments of the disclosed rubber compositions are diene elastomers. Such elastomers are understood to be those elastomers resulting at least in part, i.e., a homopolymer or a copolymer, from diene monomers, i.e., monomers having two double carbon-carbon bonds, whether conjugated or not.

These diene elastomers may be classified as either "essentially unsaturated" diene elastomers or "essentially saturated" diene elastomers. As used herein, essentially unsaturated diene elastomers are diene elastomers resulting at least in part from conjugated diene monomers, the essentially unsaturated diene elastomers having a content of such members or units of diene origin (conjugated dienes) that is at least 15 mol. %. Within the category of essentially unsaturated diene elastomers are highly unsaturated diene elastomers, which are diene elastomers having a content of units of diene origin (conjugated diene) that is greater than 50 mol. %.

Those diene elastomers that do not fall into the definition of being essentially unsaturated are, therefore, the essentially saturated diene elastomers. Such elastomers include, for example, butyl rubbers and copolymers of dienes and of alpha-olefins of the EPDM type. These diene elastomers have low or very low content of units of diene origin (conjugated dienes), such content being less than 15 mol. %. Particular embodiments of the rubber compositions disclosed herein contain no essentially saturated diene elastomers.

Examples of suitable functionalized highly unsaturated diene elastomers include SBR, which is a copolymer of styrene and butadiene and is one of the most commonly used rubbers. It is typically manufactured by one of two processes—an emulsion process producing E-SBR and a solution process producing S-SBR. Particular embodiments of the present invention contemplate utilizing S-SBR, E-SBR or combinations thereof as the middle-chain functionalized elastomer, the end-chain functionalized elastomer or both.

The microstructure of SBR is typically described in terms of the amount of bound styrene and the form of the butadiene portion of the polymer. A typical SBR that is often suitable for use in tires is around 25 wt. % bound styrene. Particular embodiments of the present invention may utilize an SBR having a bound styrene content, for example, of between 3 wt. % and 35 wt. % or alternatively between 3 wt. % and 30 wt. %, between 3 wt. % and 25 wt. %, between 3 wt. % and 15 wt. %, between 5 wt. % and 20 wt. % or between 5 wt. % and 15 wt. % bound styrene.

Because of the double bond present in the butadiene portion of the SBR, the butadiene portion is made up of three forms: cis-1,4,trans-1,4 and vinyl-1,2. SBR materials suitable for use as a functionalized rubber may be described as having a vinyl-1,2-bond content of between 4 mol. % and 30 mol. % or alternatively, between 4 mol. % and 25 mol. % or between 4 mol. % and 20 mol. %.

As known to those having ordinary skill in the art, the processing conditions under which the polymerization takes place determines the microstructure of the SBR product. Typically, as the styrene content and the vinyl content of the SBR increases, the Tg of the material increases.

Another example of a suitable highly unsaturated diene elastomer useful as a functionalized elastomer in particular embodiments of the disclosed rubber composition is polybutadienes, particularly those having a content of 1,2-units of between 4 mol. % and 80 mol. % or those having a cis-1,4 content of more than 80 mol. % greater than 90 mol. % or greater than 96 mol. %. The glass transition temperatures of polybutadiene may be adjusted by varying the vinyl content of the polymer using methods that are well known in the art and therefore a functionalized polybutadiene rubber may be used either as a middle-chain functionalized rubber or an end-chain functionalized rubber.

In particular embodiments, the highly unsaturated middle-functionalized elastomer may be an SBR, a BR or combinations thereof. Likewise in particular embodiments the highly unsaturated end-functionalized elastomer may be an SBR, a BR or combinations thereof. It may be useful in some embodiments to limit the highly unsaturated middle-functionalized elastomer and/or the highly unsaturated end-functionalized elastomer to just an SBR or just a BR.

In addition to the rubber components described above, the rubber composition disclosed herein may further include a reinforcing filler. Reinforcing fillers are added to rubber compositions to, inter alia, improve their tensile strength and wear resistance. Any suitable reinforcing filler may be suitable for use in compositions disclosed herein including, for example, carbon blacks and/or inorganic reinforcing fillers such as silica, with which a coupling agent is typically associated. As noted below, there are embodiments of the rubber composition that include very little or no carbon black.

For those embodiments that contain carbon black, suitable carbon blacks include, for example, those of the type HAF, ISAF and SAF, conventionally used in tires. Reinforcing blacks of ASTM grade series 100, 200 and/or 300 are suitable such as, for example, the blacks N115, N134, N234, N330, N339, N347, N375 or alternatively, depending on the intended application, blacks of higher ASTM grade series such as N660, N683 and N772.

Inorganic reinforcing fillers include any inorganic or mineral fillers, whatever its color or origin (natural or synthetic), that are capable without any other means, other than an intermediate coupling agent, or reinforcing a rubber composition intended for the manufacture of tires. Such inorganic reinforcing fillers can replace conventional tire-grade carbon blacks, in whole or in part, in a rubber composition intended for the manufacture of tires. Typically such fillers may be characterized as having the presence of hydroxyl (—OH) groups on its surface.

Inorganic reinforcing fillers may take many useful forms including, for example, as powder, microbeads, granules, balls and/or any other suitable form as well as mixtures thereof. Examples of suitable inorganic reinforcing fillers include mineral fillers of the siliceous type, such as silica ($SiO_2$), of the aluminous type, such as alumina ($AlO_3$) or combinations thereof.

Useful silica reinforcing fillers known in the art include fumed, precipitated and/or highly dispersible silica (known as "HD" silica). Examples of highly dispersible silicas include Ultrasil 7000 and Ultrasil 7005 from Degussa, the silicas Zeosil 1165MP, 1135MP and 1115MP from Rhodia, the silica Hi-Sil EZ150G from PPG and the silicas Zeopol 8715, 8745 and 8755 from Huber. In particular embodiments, the silica may have a BET surface area, for example, of between 60 $m^2/g$ and 250 $m^2/g$ or alternatively between 80 $m^2/g$ and 230 $m^2/g$.

Examples of useful reinforcing aluminas are the aluminas Baikalox A125 or CR125 from Baikowski, APA-100RDX from Condea, Aluminoxid C from Degussa or AKP-G015 from Sumitomo Chemicals.

For coupling the inorganic reinforcing filler to the diene elastomer, a coupling agent that is at least bifunctional provides a sufficient chemical and/or physical connection between the inorganic reinforcement filler and the diene elastomer. Examples of such coupling agents include bifunctional organosilanes or polyorganosiloxanes. Such coupling agents and their use are well known in the art. The coupling agent may optionally be grafted beforehand onto the diene elastomer or onto the inorganic reinforcing filler as is known. Otherwise it may be mixed into the rubber composition in its free or non-grafted state. One useful coupling agent is X 50-S, a 50-50 blend by weight of Si69 (the active ingredient) and N330 carbon black, available from Evonik Degussa.

In the rubber compositions according to the invention, the coupling agent may be included at any suitable amount for the given application, examples of which are between 2 phr and 15 phr or alternatively, between 2 phr and 12 phr. It is generally desirable to minimize its use. In particular embodiments, the amount of coupling agent may represent between 0.5 and 15 wt. % relative to the total weight of the silica filler. In the case for example of tire treads for passenger vehicles, the coupling agent may be less than 12 wt. % or even less than 8 wt. % relative to the total weight of the silica filler.

In particular embodiments, the amount of total reinforcing filler (carbon black (if used) and/or reinforcing inorganic filler) may include any suitable amount for the given application, examples of which are between 20 phr and 200 phr or alternatively between 50 phr and 150 phr, between 90 phr and 130 phr or between 50 phr and 175 phr of reinforcing filler.

As noted above particular embodiments provide that carbon black is explicitly excluded as a filler from the useful rubber compositions disclosed herein. However, in some embodiments a very small quantity may be included to provide coloring (black) to the tire composition and/or UV protection. Such benefits may be obtained by adding at least 0.5 phr but no more than 20 phr of carbon black or alternatively, less than 10 phr, less than 5 phr or between 0.5 phr and 10 phr of carbon black.

In addition to the diene elastomer and reinforcing filler, particular embodiments of the rubber composition disclosed herein may further include a plasticizing system. The plasticizing system may provide both an improvement to the processability of the rubber mix and/or a means for adjusting the rubber composition's glass transition temperature and/or its rigidity. Suitable plasticizing systems may include a plasticizing liquid, a plasticizing resin or combinations thereof.

Suitable plasticizing liquids may include any liquid known for its plasticizing properties with diene elastomers. At room temperature (23° C.), these liquid plasticizers or these oils of varying viscosity are liquid as opposed to the resins that are solid. Examples include those derived from petroleum stocks, those having a vegetable base and combinations thereof. Examples of oils that are petroleum based include aromatic oils, paraffinic oils, naphthenic oils, MES oils, TDAE oils and so forth as known in the industry. Also known are liquid diene polymers, the polyolefin oils, ether plasticizers, ester plasticizers, phosphate plasticizers, sulfonate plasticizers and combinations of liquid plasticizers.

Examples of suitable vegetable oils include sunflower oil, soybean oil, safflower oil, corn oil, linseed oil and cotton seed oil. These oils and other such vegetable oils may be used singularly or in combination. In some embodiments, sunflower oil having a high oleic acid content (at least 70 weight percent or alternatively, at least 80 weight percent) is useful, an example being AGRI-PURE 80, available from Cargill with offices in Minneapolis, Minn. In particular embodiments of the present invention, the selection of a suitable plasticizing oil is limited to a vegetable oil having a high oleic acid content.

The amount of plasticizing liquid useful in any particular embodiment of the present invention depends upon the particular circumstances and the desired result. In general, for example, the plasticizing liquid may be present in the rubber composition in an amount of between 0 or 10 phr and 60 phr or alternatively, between 0 or 10 phr and 55 phr, between 0 or 10 phr and 50 phr, between 0 or 5 phr and 40 phr or between 0 or 10 phr and 35 phr. In particular embodiments, there may be no plasticizing liquid utilized.

A plasticizing hydrocarbon resin is a hydrocarbon compound that is solid at ambient temperature (e.g., 23° C.) as opposed to a liquid plasticizing compound, such as a plasticizing oil. Additionally a plasticizing hydrocarbon resin is compatible, i.e., miscible, with the rubber composition with which the resin is mixed at a concentration that allows the resin to act as a true plasticizing agent, e.g., at a concentration that is typically at least 5 phr (parts per hundred parts rubber by weight).

Plasticizing hydrocarbon resins are polymers that can be aliphatic, aromatic or combinations of these types, meaning that the polymeric base of the resin may be formed from aliphatic and/or aromatic monomers. These resins can be natural or synthetic materials and can be petroleum based, in which case the resins may be called petroleum plasticizing resins, or based on plant materials. In particular embodiments, although not limiting the invention, these resins may contain essentially only hydrogen and carbon atoms.

The plasticizing hydrocarbon resins useful in particular embodiment of the present invention include those that are homopolymers or copolymers of cyclopentadiene (CPD) or dicyclopentadiene (DCPD), homopolymers or copolymers of terpene, homopolymers or copolymers of $C_5$ cut and mixtures thereof.

Such copolymer plasticizing hydrocarbon resins as discussed generally above may include, for example, resins made up of copolymers of (D)CPD/vinyl-aromatic, of (D)CPD/terpene, of (D)CPD/$C_5$ cut, of terpene/vinyl-aromatic, of $C_5$ cut/vinyl-aromatic and of combinations thereof.

Terpene monomers useful for the terpene homopolymer and copolymer resins include alpha-pinene, beta-pinene and limonene. Particular embodiments include polymers of the limonene monomers that include three isomers: the L-limonene (laevorotatory enantiomer), the D-limonene (dextrorotatory enantiomer), or even the dipentene, a racemic mixture of the dextrorotatory and laevorotatory enantiomers.

Examples of vinyl aromatic monomers include styrene, alpha-methylstyrene, ortho-, meta-, para-methylstyrene, vinyl-toluene, para-tertiobutylstyrene, methoxystyrenes, chloro-styrenes, vinyl-mesitylene, divinylbenzene, vinyl-naphthalene, any vinyl-aromatic monomer coming from the $C_9$ cut (or, more generally, from a $C_8$ to $C_{10}$ cut). Particular embodiments that include a vinyl-aromatic copolymer include the vinyl-aromatic in the minority monomer, expressed in molar fraction, in the copolymer.

Particular embodiments of the present invention include as the plasticizing hydrocarbon resin the (D)CPD homopolymer resins, the (D)CPD/styrene copolymer resins, the polylimonene resins, the limonene/styrene copolymer resins, the limonene/D(CPD) copolymer resins, $C_5$ cut/styrene copolymer resins, $C_5$ Cut/$C_9$ cut copolymer resins, and mixtures thereof.

Commercially available plasticizing resins that include terpene resins suitable for use in the present invention include a polyalphapinene resin marketed under the name Resin R2495 by Hercules Inc. of Wilmington, Del. Resin R2495 has a molecular weight of about 932, a softening point of about 135° C. and a glass transition temperature of about 91° C. Another commercially available product that may be used in the present invention includes DERCOLYTE L120 sold by the company DRT of France. DERCOLYTE L120 polyterpene-limonene resin has a number average molecular weight of about 625, a weight average molecular weight of about 1010, an Ip of about 1.6, a softening point of about 119° C. and has a glass transition temperature of about 72° C. Still another commercially available terpene resin that may be used in the present invention includes SYLVARES TR 7125 and/or SYLVARES TR 5147 polilimonene resin sold by the Arizona Chemical Company of Jacksonville, Fla. SYLVARES 7125 polylimonene resin has a molecular weight of about 1090, has a softening point of about 125° C., and has a glass transition temperature of about 73° C. while the SYLVARES TR 5147 has a molecular weight of about 945, a softening point of about 120° C. and has a glass transition temperature of about 71° C.

Other suitable plasticizing hydrocarbon resins that are commercially available include $C_5$ cut/vinyl-aromatic styrene copolymer, notably $C_5$ Cut/styrene or $C_5$ cut/$C_9$ cut from Neville Chemical Company under the names SUPER NEVTAC 78, SUPER NEVTAC 85 and SUPER NEVTAC 99; from Goodyear Chemicals under the name WINGTACK EXTRA; from Kolon under names HIKOREZ T1095 and HIKOREZ T1100; and from Exxon under names ESCOREZ 2101 and ECR 373.

Yet other suitable plasticizing hydrocarbon resins that are limonene/styrene copolymer resins that are commercially available include DERCOLYTE TS 105 from DRT of France; and from Arizona Chemical Company under the name ZT115LT and ZT5100.

It may be noted that the glass transition temperatures of plasticizing resins may be measured by Differential Scanning calorimetry (DCS) in accordance with ASTM D3418 (1999). In particular embodiments, useful resins may be have a glass transition temperature that is at least 25° C. or alternatively, at least 40° C. or at least 60° C. or between 25° C. and 95° C., between 40° C. and 85° C. or between 60° C. and 80° C.

The amount of plasticizing hydrocarbon resin useful in any particular embodiment of the present invention depends upon the particular circumstances and the desired result. In general, for example, the plasticizing hydrocarbon resin may be present in the rubber composition in an amount of between 5 phr and 120 phr or alternatively, between 5 phr and 100 phr or between 5 phr and 60 phr. In particular embodiments, the plasticizing hydrocarbon resin may be present in an amount of between 5 phr and 70 phr, between 25 phr and 55 phr, between 20 phr and 70 phr, between 20 phr and 65 phr, between 25 phr and 65 phr, between 25 phr and 100 phr, between 55 and 120 phr, between 65 phr and 110 phr or between 15 phr and 70 phr.

The rubber compositions disclosed herein may be cured with any suitable curing system including a peroxide curing system or a sulfur curing system. Particular embodiments are cured with a sulfur curing system that includes free sulfur and may further include, for example, one or more of accelerators, stearic acid and zinc oxide. Suitable free sulfur includes, for example, pulverized sulfur, rubber maker's sulfur, commercial sulfur, and insoluble sulfur. The amount of free sulfur included in the rubber composition is not limited and may range, for example, between 0.5 phr and 10 phr or alternatively between 0.5 phr and 5 phr or between 0.5 phr and 3 phr. Particular embodiments may include no free sulfur added in the curing system but instead include sulfur donors.

Accelerators are used to control the time and/or temperature required for vulcanization and to improve the properties of the cured rubber composition. Particular embodiments of the present invention include one or more accelerators. One example of a suitable primary accelerator useful in the present invention is a sulfenamide. Examples of suitable sulfenamide accelerators include n-cyclohexyl-2-benzothiazole sulfenamide (CBS), N-tert-butyl-2-benzothiazole Sulfenamide (TBBS), N-Oxydiethyl-2-benzthiazolsulfenamid (MBS) and N'-dicyclohexyl-2-benzothiazolesulfenamide (DCBS). Combinations of accelerators are often useful to improve the properties of the cured rubber composition and the particular embodiments include the addition of secondary accelerators.

Particular embodiments may include as a secondary accelerant the use of a moderately fast accelerator such as, for example, diphenylguanidine (DPG), triphenyl guanidine (TPG), diorthotolyl guanidine (DOTG), o-tolylbigaunide (OTBG) or hexamethylene tetramine (HMTA). Such accelerators may be added in an amount of up to 4 phr, between 0.5 and 3 phr, between 0.5 and 2.5 phr or between 1 and 2 phr. Particular embodiments may exclude the use of fast accelerators and/or ultra-fast accelerators such as, for example, the fast accelerators: disulfides and benzothiazoles; and the ultra-accelerators: thiurams, xanthates, dithiocarbamates and dithiophosphates.

Other additives can be added to the rubber compositions disclosed herein as known in the art. Such additives may include, for example, some or all of the following: antidegradants, antioxidants, fatty acids, waxes, stearic acid and zinc oxide. Examples of antidegradants and antioxidants include 6PPD, 77PD, IPPD and TMQ and may be added to rubber compositions in an amount, for example, of from 0.5 phr and 5 phr. Zinc oxide may be added in an amount, for example, of between 1 phr and 6 phr or alternatively, of between 1.5 phr and 4 phr. Waxes may be added in an amount, for example, of between 1 phr and 5 phr.

The rubber compositions that are embodiments of the present invention may be produced in suitable mixers, in a manner known to those having ordinary skill in the art, typically using two successive preparation phases, a first phase of thermo-mechanical working at high temperature, followed by a second phase of mechanical working at lower temperature.

The first phase of thermo-mechanical working (sometimes referred to as "non-productive" phase) is intended to mix thoroughly, by kneading, the various ingredients of the composition, with the exception of the vulcanization system. It is carried out in a suitable kneading device, such as an internal mixer or an extruder, until, under the action of the mechanical working and the high shearing imposed on the mixture, a maximum temperature generally between 120° C. and 190° C., more narrowly between 130° C. and 170° C., is reached.

After cooling of the mixture, a second phase of mechanical working is implemented at a lower temperature. Sometimes referred to as "productive" phase, this finishing phase consists of incorporating by mixing the vulcanization (or cross-linking) system (sulfur or other vulcanizing agent and accelerator(s)), in a suitable device, for example an open mill. It is performed for an appropriate time (typically between 1 and 30 minutes, for example between 2 and 10 minutes) and at a sufficiently low temperature lower than the vulcanization temperature of the mixture, so as to protect against premature vulcanization.

The rubber composition can be formed into useful articles, including treads for use on vehicle tires. The treads may be formed as tread bands and then later made a part of a tire or they be formed directly onto a tire carcass by, for example, extrusion and then cured in a mold. As such, tread bands may be cured before being disposed on a tire carcass or they may be cured after being disposed on the tire carcass. Typically a tire tread is cured in a known manner in a mold that molds the tread elements into the tread.

It is recognized that treads may be formed from only one rubber composition or in two or more layers of differing rubber compositions, e.g., a cap and base construction. In a cap and base construction, the cap portion of the tread is made of one rubber composition that is designed for contact with the road. The cap is supported on the base portion of the tread, the base portion made of a different rubber composition. In particular embodiments of the present invention the entire tread may be made from the rubber compositions as disclosed herein while in other embodiments only the cap portions of the tread may be made from such rubber compositions.

While the tire treads disclosed herein are suitable for many types of vehicles, particular embodiments include tire treads for use on vehicles such as passenger cars and/or light trucks. Such tire treads are also useful for all weather tires, snow tires and/or warm weather tires. As such, the properties of the cured rubber compositions from which the treads disclosed herein may be manufactured may have a glass transition temperature of between −40° C. and −5° C. and/or alternatively, between −35° C. and −15° C., and/or between −30° C. and −15° C.

In particular embodiments, such rubber composition may further be characterized as having a shear modulus G* measured at 60° C. of between 0.5 MPa and 1.4 MPa or alternatively, 0.6 MPa and 1.4 MPa, between 0.5 MPa and 1.2 MPa or 0.6 MPa and 1.1 MPa.

The invention is further illustrated by the following examples, which are to be regarded only as illustrations and not delimitative of the invention in any way. The properties of the compositions disclosed in the examples were evaluated as described below and these utilized methods are suitable for measurement of the claimed properties of the present invention.

Modulus of elongation (MPa) was measured at 10% (MA10) at a temperature of 23° C. based on ASTM Standard D412 on dumb bell test pieces. The measurements were taken in the second elongation; i.e., after an accommodation cycle. These measurements are secant moduli in MPa, based on the original cross section of the test piece.

Wet braking for a tire mounted on an automobile fitted with an ABS braking system was determined by measuring the distance necessary to go from 50 MPH to 0 MPH upon sudden braking on wetted ground (asphalt concrete). A value greater than that of the control, which is arbitrarily set to 100, indicates an improved result, that is to say a shorter braking distance.

Wear resistance of a tire mounted on an automobile was measured by subjecting the tire to actual on-road travel and measuring its wear rate (mm of tread lost per 1000 miles) at between 10,000 and 12,000 miles traveled. A value greater than that of the control, arbitrarily set to 100, indicates an improved result, that is to say less wear rate.

The maximum tan delta dynamic properties for the rubber compositions were measured at 23° C. on a Metravib Model VA400 ViscoAnalyzer Test System in accordance with ASTM D5992-96. The response of a sample of vulcanized material (double shear geometry with each of the two 10 mm diameter cylindrical samples being 2 mm thick) was recorded as it was being subjected to an alternating single sinusoidal shearing stress at a frequency of 10 Hz under a controlled temperature of 23° C. Scanning was effected at an amplitude of deformation of 0.05 to 50% (outward cycle) and then of 50% to 0.05% (return cycle). The maximum value of the tangent of the loss angle tan delta (max tan δ) was determined during the return cycle.

Dynamic properties (Tg and G*) for the rubber compositions were measured on a Metravib Model VA400 ViscoAnalyzer Test System in accordance with ASTM D5992-96. The response of a sample of vulcanized material (double shear geometry with each of the two 10 mm diameter cylindrical samples being 2 mm thick) was recorded as it was being subjected to an alternating single sinusoidal shearing stress of a constant 0.7 MPa and at a frequency of 10 Hz over a temperature sweep from −60° C. to 100° C. with the temperature increasing at a rate of 1.5° C./min. The shear modulus G* at 60° C. was captured and the temperature at which the max tan delta occurred was recorded as the glass transition temperature, Tg.

Reference will now be made in detail to embodiments of the invention, one or more examples of which are illustrated in the drawings. Each example is provided by way of explanation of the invention. For example, features illustrated or described as part of one embodiment can be used with another embodiment to yield still a third embodiment. It is intended that the present invention include these and other modifications and variations.

The invention is further illustrated by the following examples, which are to be regarded only as illustrations and not delimitative of the invention in any way.

EXAMPLE 1

Rubber compositions were prepared using the components shown in Table 1. The amount of each component making up the rubber compositions shown in Table 1 are provided in parts per hundred parts of rubber by weight (phr).

The MC SBR was a middle-chain functionalized SBR with a middle-chain functionality of an aminoalkoxysilane. The MC SBR was functionalized with the aminoalkoxysilane moiety $HO-Si-Me_3-N(CH_2CH_3)_2$ (a tertiary amine) prepared according to the process described in US2011/0178233.

The EC SBR was an end-chain functionalized SBR with an end-chain functionality of a silanol. The EC SBR was functionalized with the dimethylsilanol group prepared according to the process described in U.S. Pat. No. 6,013,718.

The resin was a C5-C9 resin available from Exxon-Mobil as OPERA 373 having a glass transition temperature of −45° C. The plasticizing oil was AGRI-PURE 80. The silane coupling agent was Si69 available from Evonik Degussa. The silica was Zeosil 160ii. The curative package included sulfur, accelerators, zinc oxide and stearic acid. The additives included wax and 6PPD.

TABLE 1

Rubber Formulations

| | Formulations | | | | | | |
|---|---|---|---|---|---|---|---|
| | W1 | W2 | W3 | W4 | F1 | F2 | F3 |
| MC SBR, Tg −88 C. | 100 | | | | 70 | 70 | 70 |
| EC SBR, Tg −65 C. | | 100 | | | 30 | | |
| EC SBR, Tg −48 C. | | | 100 | | | 30 | |
| EC SBR, Tg −24 C. | | | | 100 | | | 30 |
| Silica | 107 | 107 | 107 | 107 | 107 | 107 | 107 |
| CB | 8.6 | 8.6 | 8.6 | 8.6 | 8.6 | 8.6 | 8.6 |
| Plasticizing Oil | 3.5 | 18.3 | 31.9 | 48.6 | 9.6 | 13 | 19.3 |
| Resin | 77.3 | 49 | 28.5 | 0 | 66.8 | 61 | 53.7 |
| Silane Coupling Agent | 8.6 | 8.6 | 8.6 | 8.6 | 8.6 | 8.6 | 8.6 |
| Additives | 3.4 | 3.4 | 3.4 | 3.4 | 3.4 | 3.4 | 3.4 |
| Curing Package | 8.1 | 8.1 | 8.1 | 8.1 | 8.1 | 8.1 | 8.1 |

The rubber formulations were prepared by mixing the components given in Table 1, except for the sulfur and the accelerators, in a Banbury mixer operating between 25 and 65 RPM until a temperature of between 130° C. and 170° C. was reached. The accelerators and sulfur were added in the second phase on a mill. Vulcanization was effected at 150° C. for 40 minutes. The formulations were then tested to measure their physical properties, the results of which are shown in Tables 2a and 2b.

TABLE 2a

Test Results

| Physical Properties | W1 | W2 | W3 | W4 | F1 | F2 | F3 |
|---|---|---|---|---|---|---|---|
| Tg, ° C. | −25.6 | −25.2 | −25.9 | −24.6 | −26.7 | −27.3 | −25.9 |
| Shear Modulus G* @ 60° C. | 0.78 | 0.75 | 0.84 | 0.83 | 0.73 | 0.71 | 0.68 |
| Max Tan Delta @ 23° C. | 0.28 | 0.31 | 0.32 | 0.31 | 0.30 | 0.29 | 0.28 |

TABLE 2a-continued

Test Results

| Physical Properties | W1 | W2 | W3 | W4 | F1 | F2 | F3 |
|---|---|---|---|---|---|---|---|
| MA10 @ 23° C. (MPa) | 2.8 | 3.2 | 3.9 | 4.2 | 2.9 | 2.8 | 2.6 |

TABLE 2b

Test Results

| Tire Tests | W1 | W2 | W3 | W4 | F1 | F2 | F3 |
|---|---|---|---|---|---|---|---|
| Wet Braking, Normalized | 99 | 100 | 100 | 101 | 100 | 98 | 98 |
| Wear, Normalized | 101 | 100 | 91 | 75 | 107 | 104 | 100 |

Tires (205-55R16) were manufactured using each of the formulations shown in Table 1 to form the tire treads and were tested for their wet braking and wear performance in accordance with the test procedures described above. The road test results are shown in Table 2. As may be seen from these test results, there was a synergistic effect of blending the mid-chain and end-chain functionalized elastomers so that the wear results of the blended elastomers were significantly better than the average of the wear results of mixtures containing just the single elastomer with little or no detriment to the wet braking performance.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A tread for a tire, the tread comprising a rubber composition that is based upon a cross-linkable rubber composition, the cross-linkable rubber composition comprising, per 100 parts by weight of rubber (phr):
   between 50 phr and 90 phr of a first highly unsaturated elastomer being middle chain functionalized with an aminoalkoxysilane group and having a Tg of between −108° C. and −80° C.;
   between 10 phr and 50 phr of a second highly unsaturated elastomer being end-chain functionalized with a silanol group and having a Tg of between −60° C. and −15° C.;
   between 50 phr and 150 phr of a silica filler;
   a plasticizing system comprising between 5 phr and 120 phr of a plasticizing resin having a Tg of at least 25° C. and between 0 phr and 60 phr of a plasticizing liquid; and
   a curing system.

2. The tread of claim 1, wherein the first highly unsaturated elastomer is selected from an SBR, a BR or combinations thereof.

3. The tread of claim 2, wherein the first highly unsaturated elastomer is between 60 phr and 80 phr.

4. The tread of claim 1, wherein the second highly unsaturated elastomer is selected from an SBR, a BR or combinations thereof.

5. The tread of claim 4, wherein the second highly unsaturated elastomer is between 20 phr and 40 phr.

6. The tread of claim 1, wherein the tread has a glass transition temperature of between −40° C. and −5° C. after cure.

7. The tread of claim 1, wherein the filler is between 90 phr and 120 phr of silica.

8. The tread of claim 1, wherein the first highly unsaturated elastomer is between 60 phr and 80 phr.

9. The tread of claim 1, wherein the second highly unsaturated elastomer is between 20 phr and 40 phr.

10. The tread of claim 1, wherein the first highly unsaturated elastomer has a Tg of between −95° C. and −80° C.

11. The tread of claim 1, wherein the curing system is a sulfur curing system.

12. The tread of claim 1, wherein the tread is fully formed from the cross-linkable rubber composition.

13. The tread of claim 1, wherein the cross-linkable rubber composition further comprises no more than 5 phr of a third highly unsaturated elastomer.

14. The tread of claim 1, wherein the cross-linkable rubber composition includes 0 phr of another elastomeric component.

15. The tread of claim 1, wherein the liquid plasticizer component is limited to the group consisting of sunflower oil, soybean oil, safflower oil, corn oil, linseed oil cotton seed oil and combinations thereof.

* * * * *